Sept. 13, 1966 R. W. STEER, JR 3,273,136
PHASE REPEATER SERVO
Filed March 9, 1964 2 Sheets-Sheet 1

INVENTOR.
ROBERT W. STEER, JR.
BY Jack Lausen
ATTORNEY

Sept. 13, 1966 R. W. STEER, JR 3,273,136
PHASE REPEATER SERVO
Filed March 9, 1964 2 Sheets-Sheet 2

INVENTOR.
ROBERT W. STEER, JR.
BY Jack Larsen
ATTORNEY

United States Patent Office 3,273,136
Patented Sept. 13, 1966

3,273,136
PHASE REPEATER SERVO
Robert W. Steer, Jr., Haverhill, Mass., assignor to Massachusetts Institute of Technology, Cambridge, Mass., a corporation of Massachusetts
Filed Mar. 9, 1964, Ser. No. 350,226
11 Claims. (Cl. 340—198)

This invention relates to a phase-repeater system for an electromechanical resolver and in particular to an all-electronic phase repeater servo with incremental read out.

A resolver is a device which may yield an electrical output proportional to the sine of the angular position of the input shaft with respect to an appropriate reference. Generally an output signal is obtained from a "pick-up" coil which may be rotated in an alternating magnetic field. When the coil is in alignment with an alternating flux field, output amplitude is maximum and when the coil is orthogonal to the field, pick-up is zero. When a second alternating magnetic field, orthogonal to the original field (90 mechanical degrees), is excited with a signal displaced 90 electrical degrees in phase from the original reference signal, the output of the resolver is an alternating current with the phase of the signal varying in accordance with the angle between the pick-up coil and the reference, and with the amplitude remaining constant. Such a resolver is sometimes known as a one-speed synchro control transmitter. By building the reference field structure in the manner of a multipole two-phase motor stator structure, the phase of the output signal can be made to vary as a small integral multiple of the shaft angle. A device of this kind is called a multi-speed synchro. In particular, a "6-speed synchro," would have 90 degrees of output phase variation for each 15 degrees of shaft angle change.

The manufacture of resolvers has become a highly developed art. The inherent mechanical accuracy of these instruments in many cases is much better than 1 minute of shaft rotation. Because of the small size, low shaft inertia, precision and reliability of instruments of this kind, they may be preferred as goniometers even though the alternating current of the resolver must be converted to another form for use in the system. In particular, a synchro may be preferred when an incremental digital output is required, notwithstanding the availability of instruments designed to give a direct digital output.

It is an object of this invention to provide an incremental digital output signal from an electromechanical resolver. It is another object of the invention to provide an electronic "gearing system" by which the phase-angle variation of an alternating signal may be made a high integral multiple of the shaft angle rotation of a resolver. Another object of the invention is to provide a resolver system having both a sinusoidal and an incremental digital output of the shaft angle. A feature of the present invention whereby the above objects are achieved is the generation of a reference phase at the synchro field frequency by dividing down the output of a higher frequency oscillator, which oscillator is voltage controlled by the error signal between the reference phase and the resolver output signal. Other features and objects of the invention will be apprehended from the following specification and annexed drawings of which:

Figure 1:
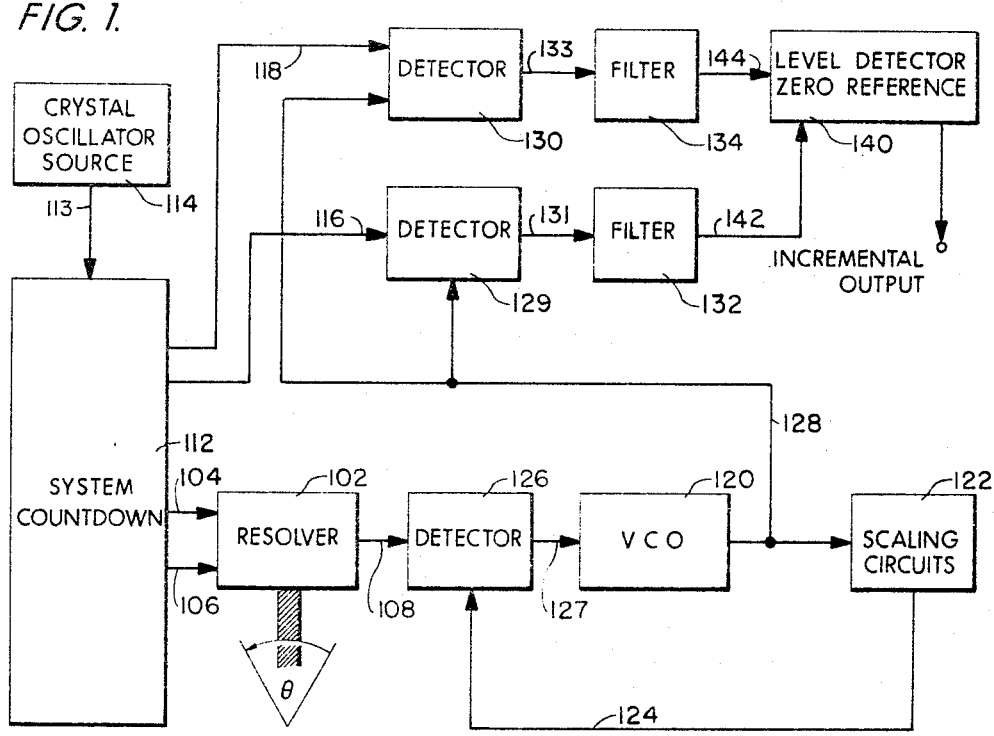
FIG. 1 is a block diagram of the single channel phase repeater servo of the invention.

FIG. 1 is a block diagram of a single channel phase repeater servo with incremental readout in accordance with the invention. FIG. 1 is also a flow chart for information. In this specification the usual reference characters will be used to denote the physical means shown. Reference characters preceded by S refer to the intangible information or signal associated with the means designated. Thus S104 refers to the signal in channel 104.

The resolver 102 is supplied with a phase reference signal S104 through channel 104 and a quadrature reference signal S106 through channel 106, both at a convenient frequency for the operation of the synchro, which in this example is taken at 1000 cycles per second. The 1000 cycle waves S104 and S106 are generated by scaling down in a countdown system 112 from a higher frequency signal S113 appearing in the connection 113 to a crystal oscillator source 114, in this example at 200 kilocycles per second frequency. The system countdown 112 also generates signals at various intermediate frequencies between 200 kilocycles and 1 kilocycle which are precisely related in frequency and phase to the oscillator and reference signal frequencies. One of these signals, S116 at 10 kilocycles, is brought out from the countdown 112 through channel 116 to provide a third reference frequency; a fourth reference signal S118 is brought out in quadrature through channel 118 to provide a reference to the 10 kilocycle reference signal S116 on channel 116. A wave S128 having a frequency in the neighborhood of, and averaging, 10 kilocycles is also generated by the voltage controlled oscillator 120 and divided by the divider circuit 122 to produce in channel 124 a variable frequency signal S124 with an average frequency of 1 kilocycle. In detector 126, the phase of the variable signal S124 is compared with the output of signal S108 in channel 108 from the resolver 102. The resulting error signal S127 is applied through channel 127 to the voltage controlled oscillator 120 in the appropriate sense to bring the variable wave S124 of channel 124 into coincidence with the one kilocycle output S108 of the resolver. In order to match the signal S124 to each degree shift in phase of the one kilocycle output S108, a 10 degree phase modulation of the output S128 of the voltage controlled oscillator 120 is required. This is in consequence of the operation of the dividing circuit 122. The phase-shifted output S128 carried in channel 128 is compared in detectors 129 and 130 with the reference ten kilocycle signals S116, and S118, respectively. The resulting modulation products S131 and S133 flow through channels 131 and 133 to low pass filters 132 and 134 which remove the higher frequency modulation products of the detection process leaving difference signals S142 and S144. The amplitude of the signals S142 and S144 is a measure of the shaft angle of the resolver 102. It is exactly the phase shift of the output S108 multiplied by the factor 10 of the dividing circuit 122. The level detector zero reference circuit 140 is joined to the filters 132 and 134 by connections 142 and 144. By detecting zero crossings of the filtered signals S142 and S144, it generates a pulse for every increment of 90 degrees at the ten kilocycle frequency, or every nine degrees at the one-kilocycle frequency. Supplying the two signals S116 and S118 in quadrature at ten kilocycles provides means to detect a reversal in the direction of rotation of the resolver. In a unidirectional system the second phase would not be necessary; and an increment of output would be generated for each 18 degrees of input shaft rotation.

Electronic circuitry appropriate for each of the boxes of FIG. 1 is well known in the art; and all can be fully transistorized and packaged in a small compact configuration, resistant to shock, vibration, and moisture. For the countdown circuits 112 and 122 binary scaling circuits with feedback of pulses for decimal scaling is preferred. The general scheme of synchronizing and phase locking a high-frequency oscillator to a variable submultiple frequency is well known in the art. For example, in the synchronizing signal generators for television, the line frequency at a transmitter is ordinarily locked to the frame frequency, which, in turn, is locked to the 60-cycle power line voltage in the community.

Figure 2:
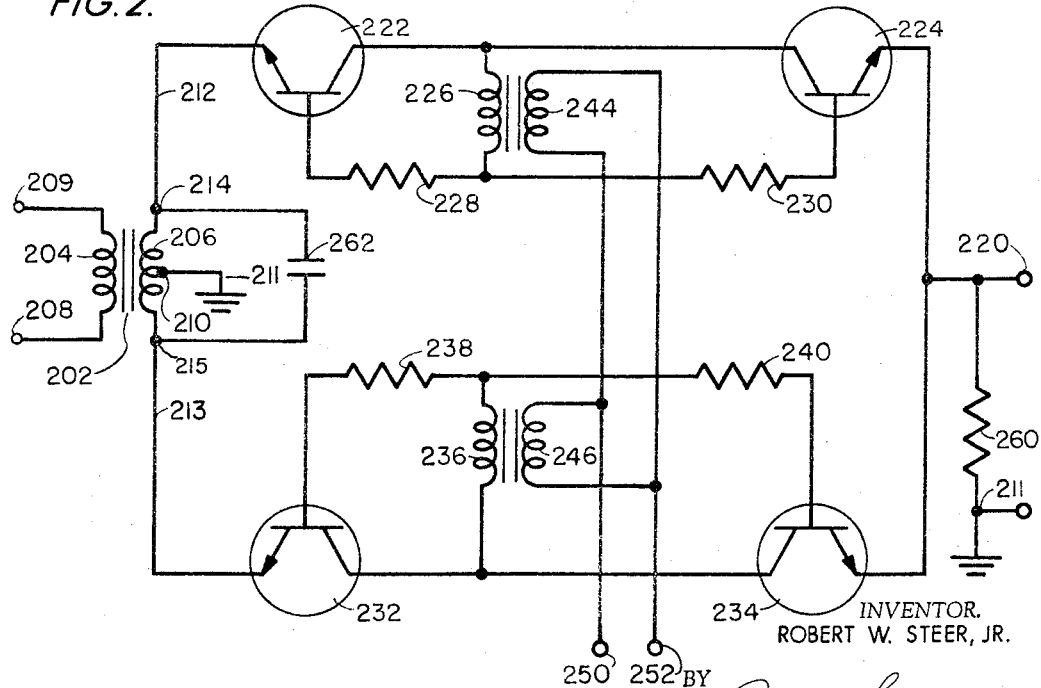
FIG. 2 is a schematic diagram of a demodulator which is a part of the system and, FIG. 3 is a schematic diagram of the preferred embodiment of a voltage-controlled oscillator for use in the system.

The choice of particular circuits for carrying out these functions must largely be a matter for the designer of a particular system for an intended environment. Circuits which have been found to be particularly appropriate to the combination of FIG. 1 include the Bright demodulator, shown in the schematic diagram of FIG. 2 and the circuit represented by the schematic diagram of FIG. 3 which is the preferred embodiment of the voltage controlled oscillator 120 of FIG. 1. The circuit of FIG. 2 is a simple four-transistor balanced modulator switch such as described by R. L. Bright "Junction Transistors Used as Switches," Communications and Electronics, American Institute of Electrical Engineers No. 17, March 1955, pages 111–121. The circuit comprises a first transformer, has a primary winding 204, a secondary winding 206, and input terminals 208 and 209. The secondary winding is center-tapped, the center tap 210 being connect to a point of fixed potential 211. Connections 212 and 213 to extremes 214 and 215 of the secondary winding 206, in the operation of the modulator, are connected alternatively through a pair of transistor switch circuits to the output terminal 220. Transistors 222 and 224, together with the winding 226 and the resistors 228 and 230, comprise a first switch circuit connecting the connection 212 to the output terminal 220. Transistors 232 and 234, together with winding 236 and resistors 238 and 240, comprise the other switch circuit. One or the other of the switch circuits is made conducting depending on the polarity between the reference input terminals 250 and 252. As a balanced modulator, the reference phase is applied to the terminals 250 and 252, the output modulation products are available between the terminal 220 and the point of fixed potential 211. A resistor 260 and a capacitor 262 are provided to somewhat dampen and smooth switching transients. Transistors 222, 224, 232 and 234 are matched pairs of type 2N1613 transistors. Resistors 228, 230, 238, and 240 are 820 ohms. The capacitor 262 is 0.001 microfarad and the resistor 260 is 10,000 ohms. All transformers are Triad type SP20 minature transistors transformers. The circuit values given are appropriate for the ten-kilocycle operating frequency of the detector 129.

There are a great many transistorized oscillator circuits known to the prior art; and all oscillators can be made to change frequency to some degree by the variation of some circuit element or some bias in the circuit. For voltage controlled oscillators, relaxation oscillator circuits (RC and RL) have generally been preferred to resonant (LC) oscillators. Resistance-capacitance (RC) oscillators (multivibrators) are the better known. The frequency of operation is determined primarily by the value of the voltage supply and the RC time constant of the collector-to-opposite-base capacitance and the collector-to-voltage-supply resistance. The frequency of such an oscillator may be varied by changing the supply voltage; however, the dependence of frequency upon voltage is not very linear. The temperature sensitivity of most capacitors is another source of difficulty for the designer.

Figure 3:
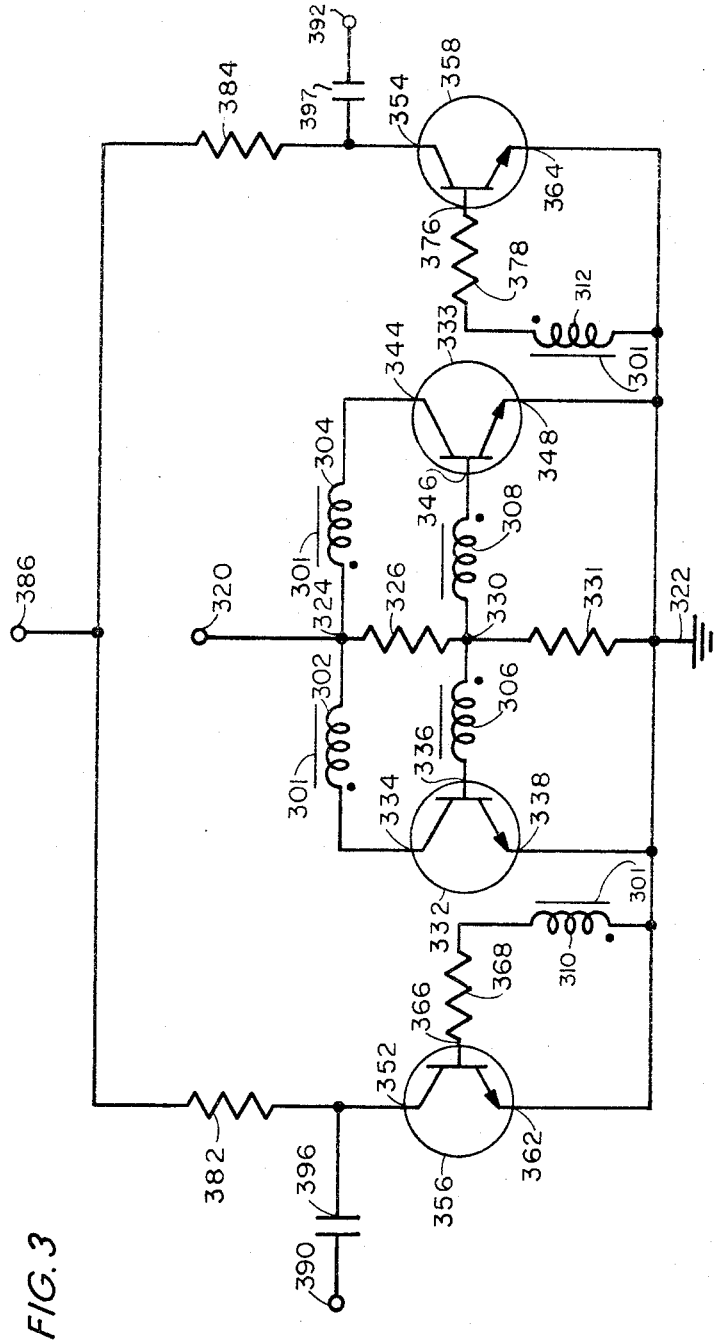

A preferred form of relaxation oscillator is one, the relaxation of which is controlled by the switching time of a square loop ferromagnetic core. To a high degree of linearity, the switching time of such a core is inversely proportional to the magnetizing force, and, therefore, also to the voltage applied to a winding. Consequently, the frequency is proportional to voltage. FIG. 3 is a schematic diagram of an oscillator based on this principle.

For ten-kilocycle operation the core 301 is an orthonol #80505–¼–MA obtained from Magnetics Inc. Primary winding 302 consists of 150 turns of #40 AWG copper wire as does the primary winding 304. Each of the secondary windings 306, 308, 310 and 312 consists of 50 turns of #40 wire.

The controlling voltage is applied between the input terminal 320 and a point of fixed potential 322. The input terminal 320 is connected to the junction 324 of primary windings 302 and 304 which are in series-aiding connection. The junction 324 is connected through a 15-thousand ohm resistor 326 to the junction 330 of the secondary windings 306 and 308 in opposite series-aiding connection, as indicated by the dots which denote the "start" of windings. The other end of each winding will be designated herein as the "end" of the winding. The junction 330 is connected by a resistor 331 of about two thousand ohms resistance to the point of fixed potential 322. Current flows from the input terminal 320 to the point of fixed potential (ground) 322 through one of the two transistors 332 and 333, only one of which may conduct at a time. The collector 334 of transistor 332 is connected to the start of primary 302. The base 336 of transistor 332 is connected to the end of secondary winding 306, and the emitter 338 of transistor 332 is connected to the ground 322. The collector 344 of transistor 333 is connected to the end of primary 304, the base 346 of transistor 333 is connected to the start of secondary winding 308, and the emitter 348 of transistor 333 is connected to the ground point 322.

Outputs in opposite phase are available at the collectors 352 and 354 of transistors 356 and 358 respectively, the emitters 362 and 364 respectively of which are connected to the ground point 322. The base 366 of transistor 356 is connected through the resistor 368 of about five-thousand-ohms resistance to the end of the secondary winding 310, the start of which is connected to the ground point 322.

The base 376 of transistor 358 is connected through a resistor 378 of about 5,000 ohms to the start of the secondary winding 312. The collectors 352 and 354 of transistors 356 and 358 respectively are supplied through resistors 382 and 384 respectively from a source of positive potential 386 at about 28 volts.

In operation only one of the oscillator transistors 332 and 333 is conducting at any given time as they alternately switch off and on in the cycle. Beginning the cycle at the time when the first-enumerated transistors has just started to conduct, the voltage applied between input terminal 320 and the ground point 322 then appears across the primary 302. The resulting magnetizing force causes the magnetization of the core 301 to begin to change direction. The changing induction induces an emf in secondary 306 which holds the transistors 332 in its conducting state until the core is fully switched, at which time, although the primary current surges to its maximum value, the induced secondary voltage drops to so low a value that the transistor 332 begins to cut off. The resulting drop in primary current from its peak value induces a negative spike on the base 336 of transistor 332 and a positive spike on the base 346 of transistor 333. These spikes tend to cut off transistor 332 and turn on transistor 333. Regeneration quickly completes the switchover process.

With transistor 332 off and transistor 333 conducting, the voltage applied between input terminal 320 and the ground point 322 appears across the other primary 304; the resulting magnetizing force causes the magnetization of the core 301 to begin to change direction. The changing induction induces an emf in secondary 308 which holds the transistor 333 in its conducting state until the core is fully switched back to its original condition, at which time, although the primary current surges to its maximum value, the induced secondary voltage drops to so low a value that transistor 333 begins to cut off. The resulting drop in primary current from its peak value induces a negative spike on the base 346 of transistor 333 and a positive spike on the base 336 of transistor 332. These spikes tend to cut off transistor 333 and turn on transistor 332 to complete the cycle.

It will be seen that the frequency of relaxation is primarily determined by the time required to switch the square-loop core. As mentioned above, this time is approximately inversely proportional to the applied magnetizing force (actually more nearly proportional to the excess of magnetizing force over coercive force). The relaxation frequency is substantially proportional to the input voltage over a range of 3½ volts to 15 volts for the values used in this embodiment. It is apparent that the amplitude of oscillation is also directly proportional to the input voltage. The output amplifiers comprising the transistors 356 and 358 remove the amplitude modulation and deliver at the output terminals 390 and 392 square waves in opposite phase.

The voltage divider consisting of the resistors 326 and 331 provides a base bias to insure that one of the transistors will conduct to start the oscillation. The resistor 331 also is used to limit the base current of the transistors. The frequency stability of the circuit with respect to temperature and time depends upon the core material. Orthonol, like most square loop materials, has a saturation flux density which varies about 0.1% per degree centigrade at operating temperature. Specially selected cores may change as little as 0.001% per degree centrigrade at operating temperature.

In building the preferred embodiment of the invention for test, industrial standard parts were used. Resistors 382 and 384 are a nominal 5,100 ohms. Resistor 331 is a nominal 2,200 ohms. The capacitors 396 and 397 are a nominal 2.2 microfarads. Transistors 332, 333, 356 and 358 are type 2N718A.

The resolver used is an American Electronic Mfg. Inc. Precision Induction Resolver, Model 1 R11W4–103 having the following specifications:

Frequency: 400 c.p.s.
Maximum input voltage: 60 v.-R.M.S.
Input impedance at 400 c.p.s.: 240+j870
Test voltage: 10 v.-R.M.S.
Effective resistance: (parallel tuned at 400 c.p.s.) 2.7 K
Low corner frequency: 20 c.p.s.
Peaking frequency: 85 kc.
Maximum perpendicularity error of axes: ±5 minutes
Total null voltage (maximum): 1 m. v./v. input
Maximum functional eror: 0.1%
Transformation ratio (rotor to stator): 0.980±0.01
Time phase shift (degrees), rotor to stator: 10.0±0.5
Inequality of rotor T.R.'s: 0.1%
D.C. winding resistance: rotor 120 ohms; stator 120 ohms
D.C. leakage at 500 v.: >10 megohms
Moment of inertia (nominal): 4 gm. cm.$^2$
Friction: 4 gm. cm. at 20° C.

This invention is fully described and analyzed in my Master of Science Thesis T–330, published by the Instrumentation Laboratory, Massachusetts Institute of Technology, March 15, 1963. Copies have been heretofore available at the Library of the Massachusetts Institute of Technology. A copy is transmitted herewith for the Patent Office Technical Library.

Although the invention has been described and illustrated in detail, it is to be clearly understood that the same is by way of illustration and example only and is not to be taken by way of limitation, the spirit and scope of this invention being limited only by the terms of the appended claims.

In particular, while the frequency of the voltage-controlled oscillator in the example given is an integral multiple of the synchro operating frequency, and the electronic "gear ratio" is exactly 10:1, nonintegral gear ratios can be generated to provide increments of output for any rational fraction of a full circle. For example, to provide seven degree increments, the crystal oscillator source could be operated at 90 kilocycles, the voltage controlled oscillator operated at 12%⁄7 kilocycles (90/7), and the resolver operated at 1000 cycles/sec. Reference signals would be generated by separate countdown circuits dividing the 90 kc. frequency by 90 and by seven. The scaling of the VCO frequency by the improper rational fraction 90/7 is best accomplished with the help of a second VCO modulated in parallel with the 12%⁄7 kc. oscillator and phase-locked to it at seven times its frequency (90 kc.). The 90 kc. frequency may be divided by 90 using seven flip-flops with feed-back.

I claim:
1. In combination
(a) an electromechanical resolver adapted to produce an electrical output S108 in a pick-up coil at a first frequency when excited with a first reference signal S104 at said frequency having a first phase, designated the reference phase, and a second reference signal S106 having a second phase substantially displaced from said reference phase, said output S108 having a phase which varies from said reference phase as the input angle $\theta$, which angle measures the rotation of said coil relative to a reference position.
(b) a source 114 of a high frequency wave S113,
(c) countdown means 112 for producing said reference signals S104 and S106 precisely locked in phase to said high frequency wave S113,
(d) countdown means 112 for producing a third reference signal S116 precisely locked in phase to said high frequency wave, said third signal having an intermediate frequency which is an improper rational fraction of said first frequency,
(e) controlled means 120 for generating a first variable frequency signal S128 having a frequency in the neighborhood of said intermediate frequency,
(f) scaling means 122 for generating a second variable frequency signal S124, phase-locked to said first variable frequency signal S128 at the frequency obtained by dividing said first variable frequency by said improper rational fraction,
(g) means 126 for comparing said second variable signal S124 with said output signal S108 and for generating an error signal S127 which depends upon the phase difference between said second variable signal S124 and said output signal S108,
(h) said controlled means 120 responsive to said error signal S127 for changing said frequency of said first variable signal S128 in the direction to minimize the phase difference between said second variable signal S124 and said output signal S108,
(i) means 129 for comparing said first variable frequency signal S128 with said third reference signal S116 and for generating a signal S131, comprising a difference signal S142 and higher frequency modulation products, where said signal S142 depends upon the phase difference between said first variable signal S128 and said third reference signal S116,
(j) means 132 for separating said difference signal S142 from said higher frequency modulation products, and
(k) means 140 for generating an incremental output signal when said difference signal S142 crosses a predetermined level.
2. In combination
(a) an electromechanical resolver adapted to produce an electrical output in a pickup coil at a first frequency when excited with a first reference signal at said frequency having a first phase, designated the reference phase, and a second reference signal having a second phase, substantially displaced from said reference phase, said output having a phase which varies from said reference phase as the input angle, said angle measuring the rotation of said coil relative to a reference position,
(b) a source of a high frequency wave,
(c) countdown means for producing said reference signals precisely locked in phase to said high frequency wave,
(d) countdown means for producing a third reference signal and a fourth reference signal in quadrature precisely locked in phase to said high frequency wave, said third and fourth signals having an intermediate frequency which is an integral multiple of said first frequency,
(e) controlled means for generating a first variable frequency signal having a frequency in the neighborhood of said intermediate frequency,
(f) scaling means for generating a second variable frequency signal phase locked to said first variable frequency signal, said first variable frequency being said integral multiple of said second variable frequency,
(g) means for comparing said second variable signal with said output signal and for generating an error signal which depends upon the phase difference between said second variable signal and said output signal,
(h) means responsive to said error signal for changing said frequency of said first variable signal in the direction to minimize the phase difference between said second variable signal and said output signal,
(i) means for comparing said first variable frequency signal with said third and fourth reference signals and for generating a pair of difference signals in quadrature which depend upon the phase difference between said first variable signal and said third and fourth reference signals, respectively,
(j) means for separating said difference signals from higher frequency modulation products, and
(k) means for generating incremental output signals from the zero crossings of said difference signals.

3. A phase-repeater servo for use with an electromechanical resolver adapted to produce an electrical output in a pick-up coil at a first frequency when excited with a first reference signal at said frequency having a first phase, designated the reference phase, and a second reference signal having a second phase substantially displaced from said first phase, said output having a phase which varies from said reference phase as the input angle, said angle measuring the rotation of said coil relative to a reference position which comprises,
(a) a crystal oscillator for generating a high frequency wave,
(b) countdown means connected to said oscillator for producing said reference signals precisely locked in phase to said high frequency wave, and for producing a third reference signal precisely locked in phase to said high-frequency wave, said third signal having an intermediate frequency which is an integral multiple of said first frequency,
(c) a voltage controlled oscillator for generating a first-variable frequency signal having a frequency in the neighborhood of said intermediate frequency,
(d) a scaling circuit for generating a second variable frequency signal, phase locked to said first variable frequency signal at the frequency of which said second variable frequency is said integral multiple,
(e) means for comparing said second variable signal with said output signal and for generating an error signal voltage which depends upon the phase difference between said second variable signal and said output signal,
(f) means for applying said error voltage to said voltage-controlled oscillator in the polarity to minimize the phase difference between said second variable signal and said output signal,
(g) a balanced modulator for comparing said first variable frequency signal with said third reference signal and for generating a difference signal which depends upon the phase difference between said first variable signal and said third reference signal,
(h) means for separating said difference signal from higher-frequency modulation products, and
(k) means for utilizing said difference signal.

4. A combination as defined in claim 1 wherein said rational fraction is an integer.

5. A combination as defined by claim 1 wherein said rational fraction is ten.

6. A combination as defined by claim 1 wherein said rational fraction is thirty-two.

7. A combination as defined by claim 1 wherein said rational fraction is a small whole number.

8. A phase repeater servo for use with an electromechanical resolver, adapted to produce an electrical output in a pick-up coil at a first frequency when excited with a first reference signal at said frequency, having a first phase, designated the reference phase, and a second reference signal having a second phase substantially displaced from said first phase, said output having a phase which varies from said reference phase at the input angle, said angle measuring the rotation of said coil relative to a reference position, said servo comprising,
(a) a crystal oscillator for generating a high frequency wave,
(b) countdown means connected to said oscillator for dividing said high frequency by a small whole number to establish an intermediate frequency,
(c) means for generating a third reference signal at said intermediate frequency,
(d) countdown means connected to said last-named means for dividing said intermediate frequency by a small integer, to establish said first frequency, precisely locked in phase to said intermediate frequency,
(e) means for generating said first reference signal at said first frequency,
(f) a voltage controlled oscillator for generating a first-variable frequency signal,
(g) a scaling circuit for dividing said first variable frequency by said small integer to establish a second variable frequency which is an integral submultiple of said first variable frequency,
(h) means for generating a second variable frequency signal at said second variable frequency, phase-locked to said first variable signal,
(i) a phase detector for comparing said second-variable frequency signal with said output signal and for generating an error voltage proportional to the phase difference between said last-named signals,
(j) means for connecting said error voltage to said voltage controlled oscillator in the polarity to minimize the phase difference between said last named signals,
(k) a balanced modulator connected to said controlled oscillator and to said countdown means for comparing said first variable signal with said third reference signal and for generating a difference signal which depends upon the phase difference between said last named signals, and
(l) means for utilizing said difference signal.

9. A phase repeater servo for use with an electromechanical resolver adapted to produce an electrical output in a pick-up coil at a first frequency when excited with a first reference signal at said frequency having a first phase, designated the reference phase, and a second reference signal having a second phase in quadrature with said first phase, said output having a phase which varies from said reference phase as the input angle, said angle measuring the rotation of said coil relative to a reference position, said servo comprising,
(a) means for generating a third reference signal at a second frequency, (b) countdown means connected to said last named means for dividing said second frequency by a rational fraction, to establish said first frequency precisely locked in phase to said intermediate frequency,
(c) means for generating said first reference signal at said first frequency,
(d) a voltage controlled oscillator for generating a first variable frequency signal,
(e) a scaling circuit for dividing said first variable frequency by said rational fraction to establish a second variable frequency,
(f) means for generating a second variable frequency signal at said second variable frequency, phase locked to said first variable signal,
(g) a phase detector for comparing said second variable frequency signal with said output signal and for generating an error voltage proportional to the phase difference between said last named signals,
(h) means for connecting said error voltage to said voltage controlled oscillator in the polarity to minimize the phase difference between said last named signals,
(i) a balanced modulator connected to said controlled oscillator and to said countdown means for comparing said first variable signal with said third reference signal and for generating a difference signal which depends upon the phase difference between said last named signals, and
(j) means for utilizing said difference signal.

10. A phase repeater servo for use with an electromechanical resolver adapted to produce an electrical output in a pick-up coil at a first frequency when excited with a first reference signal at said frequency having a first phase, designated the reference phase and a second reference signal in quadrature with said first signal, said output having a phase which varies from said reference phase as the input angle, said angle measuring the rotation of said coil relative to a reference position, said servo comprising,
(a) means for generating a third reference signal at a second frequency
(b) countdown means connected to said last-named means for dividing said second frequency by a rational fraction, to establish said first frequency precisely locked in phase to said intermediate frequency,
(c) means for generating said first reference signal at said first frequency,
(d) controlled means for generating a first variable frequency signal,
(e) means for dividing said first variable frequency by said rational fraction to establish a second variable frequency
(f) means for generating a second variable frequency signal at said second variable frequency, phase locked to said first variable signal,
(g) means for comparing said second variable frequency signal with said output signal and for generating an error signal which depends on the phase difference between said last named signals,
(h) means responsive to said error signal for controlling said frequency of said first variable signal to minimize the phase difference between said second variable signal and said output signal,
(i) means for comparing said first variable signal with said third reference signal and for generating a difference signal which depends upon the phase difference between said last named signals, and
(j) means for utilizing said difference signal.

11. A combination as defined by claim 10 in which said controlled means is an oscillator comprising,
(a) a magnetic core of square loop material,
(b) a first and a second primary windings on said core,
(c) said windings being connected at a first junction point in series aiding connection,
(d) a first and a second secondary windings on said core,
(e) said windings being connected at a second junction point in opposite series aiding connection,
(f) a first and a second transistor,
(g) a point of fixed potential,
(h) a point of variable voltage, connected to said first junction point,
(i) a first resistor connecting said first junction point and said second junction point,
(j) a second resistor connecting said second junction point and said point of fixed potential,
(k) connections between a collector, base, and emitter of said first transistor and said first primary, said first secondary and said point of fixed potential respectively, and
(l) connections between collector, base, and emitter of said second transistor and said second primary, said second secondary, and said point of fixed potential respectively.

No references cited.

NEIL C. READ, *Primary Examiner.*
T. B. HABECKER, *Assistant Examiner.*